Patented Oct. 1, 1940

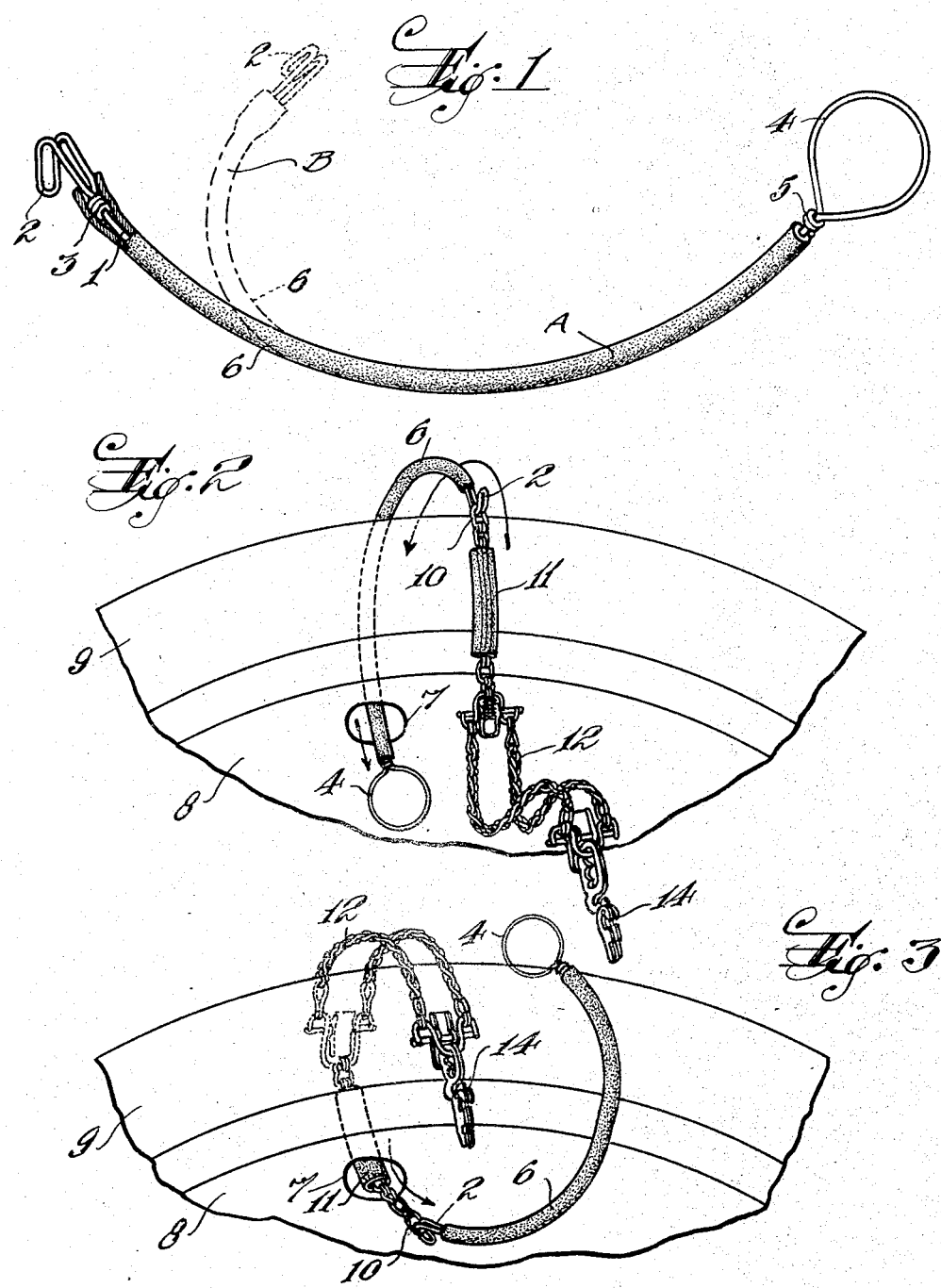

2,216,469

UNITED STATES PATENT OFFICE 2,216,469

ATTACHING TOOL FOR SECTIONAL SKID CHAIN

Charles Fischer, Newark, N. J.

Application February 15, 1938, Serial No. 190,563

1 Claim. (Cl. 81—15.8)

This invention relates to an attaching tool for sectional skid chain to facilitate the securing of a chain to an automobile wheel.

Modern automobiles are generally provided with disc wheels having very small orifices through which the tongue portion of the sectional chain may be passed. Usually the orifice is comparatively small, and considerable difficulty is experienced by the motorist in positioning the sectional skid chain around the tire and passing the tongue portion through the disc wheel aperture and latching the chain in position. The securing of sectional chains to a spoke wheel is likewise an awkward, untidy, time-consuming task.

The attaching tool of my invention may be readily passed through an aperture or between the spokes of a wheel and over the top of the tire, so that the motorist need only secure the end link of the tongue portion of the chain to the tool and then, by drawing the latter in a reverse direction, said tongue portion will be drawn through the aperture (or between the spokes) of the wheel and may then be latched, to secure the chain in position.

My attaching tool enables the motorist to secure the chain to the automobile wheel quickly and in a tidy manner.

In the accompanying drawing, in which is shown one of various possible embodiments of the several features of the invention, and wherein like reference numerals indicate like parts:

Fig. 1 represents a perspective view of an attaching tool for sectional skid chains, embodying my invention, Fig. 2 represents a side elevational view of a disc wheel, shown fragmentarily, with the attaching tool of my invention shown passed through the aperture thereof and over the top of the tire, showing the tongue portion of the sectional chain secured to the attaching tool, and Fig. 3 is a similar view showing the attaching tool, drawn in the direction of the arrow, carrying the tongue portion of the sectional skid chain through the wheel aperture.

As shown in Fig. 1, the attaching tool of my invention is preferably made from a single length of wire 1, one end of which is reentrantly, upwardly bent, to provide a hook 2, and is then wound upon the wire 1 to provide convolutions 3, lending rigidity to the structure. The other end of the wire is curled in the form of a loop 4 and is then wound upon the wire 1 to provide convolutions 5, lending rigidity to the structure. The wire 1 may be made of any ferrous or other metal and in any desired cross-section. The form shown in the drawing illustrates one type of wire found highly practical in making my invention. The wire is preferably approximately of the cross-section shown in Fig. 1. The wire should preferably be such as may be readily bent and which will hold its bent configuration without the use of tools, so that it may be bent as at A in Fig. 1 and further bent to provide an arced portion B. The wire intermediate the loop 4 and hook 2 is preferably enclosed in a rubber or other tube 6 which enables the tool to be bent without cutting one's hand and assures the smooth movement of the tool around the tire and through the wheel 9 presently explained. The loop 4 serves as a handle in manipulating the tool.

In using the attaching tool of my invention, the end 2 of the tool is passed through aperture 7 (or between spokes) of the wheel 8 and over the top of the tire 9, in a reverse direction to that indicated by the arrows in Fig. 2. The end link 10 of the tongue portion 11 of chain 12 is looped over the hook 2 and then by drawing the tool in the direction of the arrows, said tongue portion will be drawn through aperture 7 of the wheel. Then the tool may be removed and end link 10 of the chain latched in latching member 14 of the chain, securing the latter in position on the wheel.

It will be apparent that while I have shown and described my invention in the preferred form, many changes and modifications may be made in the structure disclosed without departing from the spirit of the invention, defined in the following claim.

Having thus described my invention, what I claim as new and desire to secure by Letters Patent, is:

An attaching tool for chains comprising a length of wire of non-resilient material of sufficient inherent rigidity to maintain the position in which it is bent, said wire being bent into arcuate form when arranged for use and maintaining said form during manipulation, one end of said wire being bent in the form of a hook terminating in closely wound convolutions closing the hook, the other end of said wire being in the form of a handle for manipulating the device and terminating in closely wound convolutions, and a tube of resilient material covering the wire intermediate the handle and hook, said wire being adapted to be passed through a disc-wheel aperture and around the disc-wheel tire by the use of one hand.

CHARLES FISCHER.